Dec. 31, 1963     F. B. ROBB ETAL     3,116,072
REINFORCED SPLASH GUARD
Filed Aug. 11, 1961     2 Sheets-Sheet 1
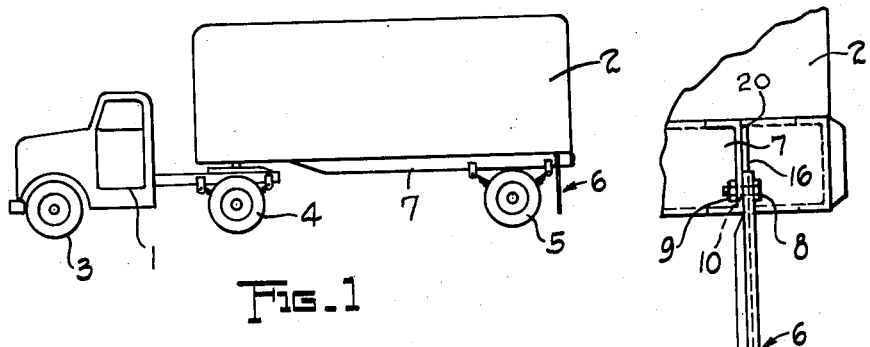
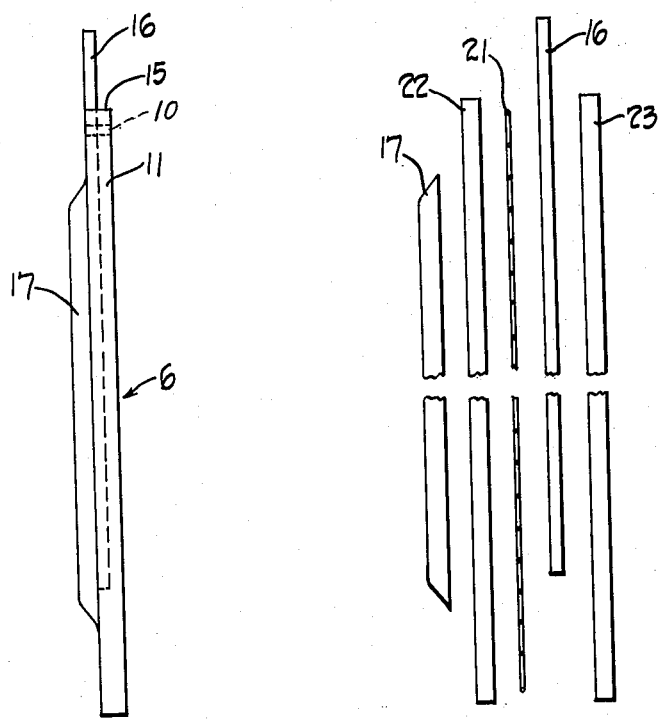
INVENTORS
F. B. ROBB
S. J. KOSIK JR.
BY
Robb & Robb
attorneys United States Patent Office 3,116,072
Patented Dec. 31, 1963

1

3,116,072
REINFORCED SPLASH GUARD
Frank B. Robb and Sam J. Kosik, Jr., both of Mayfield Heights, Ohio, assignors to Truck and Trailer Products, Inc., Cleveland, Ohio
Filed Aug. 11, 1961, Ser. No. 130,841
6 Claims. (Cl. 280—154.5)

This invention relates to splash guards, and particularly to flexible splash guards and means for rendering the same more effective in use.

Splash guards as such are known and consist usually of flexible rubber or rubber composition material formed generally rectangular in shape and adapted to be suspended adjacent the rear wheels of trucks and trailers, whereby to minimize rearward or back splash of material on a road on which the vehicle from which the flap or splash guard is suspended is traveling.

Means have been contemplated heretofore to reduce the "sailing" effect as it is called of flexible splash guards, the reason for the use of flexible splash guards being that under many conditions the truck must back into curbs and other low places where rigid fenders would be damaged and likewise damage the tires adjacent which they are suspended or positioned.

In use, flexible splash guards reduce the amount of back splash or spray but also are susceptible of being blown backward so as to permit amounts of debris and foreign matter to be thrown backwardly which would not be the case if they were controlled in such a manner as to maintain the flaps or splash guards in vertical condition.

It is a primary object of the present invention to provide a splash guard of novel construction in which the same is controlled in such a manner that the sailing effect is minimized and generally eliminated, and yet the flexible nature of the splash guard is not materially reduced to an extent which would cause the same to be damaged when contact is made with obstructions during rearward movement of the vehicle.

A more specific object of the invention is to provide a novel splash guard, in which the same is comprised of flexible material, including a member molded therein which will essentially rigidify the body of the splash guard without entirely eliminating the flexible nature thereof and the advantages accruing therefrom.

Yet another object of the invention is to provide a splash guard which is formed of flexible material, wherein means are provided in the form of rigid strips or a single strip as the case may be integrally molded into the body and extending beyond the same so as to cooperate with the mounting means and thereby minimize the backward swinging action of the flap without eliminating forward swinging action which is not objectionable and yet which permits the vehicle to back up close to a curb or similar obstruction.

Another object of the invention is to provide a splash guard in which adequate reinforcing means are provided to cooperate with the rigidifying means whereby the flap is extended in its useful life and carries out the functions previously described as being desirably provided by the novel construction hereof.

Other and further objects of the invention will be understood from a consideration of the specification appended hereto and disclosed in the drawing wherein:

FIGURE 1 is largely diagrammatic illustrating a truck and trailer connected thereto from which in the rear of the latter is suspended a flap or splash guard constructed in accordance with this invention, this being largely illustrative.

FIGURE 2 is an enlarged fragmentary view showing the section of the trailer upon which the splash guard is supported and the splash guard in somewhat greater detail.

FIGURE 3 is an enlarged fragmentary view showing in greatly enlarged detail one form of splash guard including the rigidifying means therein.

FIGURE 4 is an exploded view, somewhat fragmentary in nature showing all of the elements availed of to form a splash guard in accordance with the invention.

Figure 7:
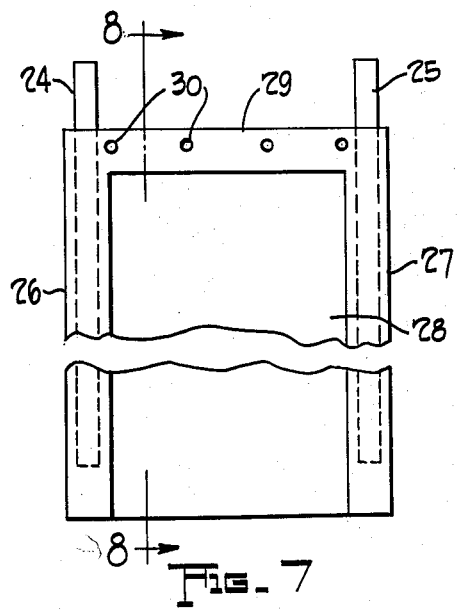

FIGURE 7 s a modified form of splash guard involving rigidifying means, this being likewise fragmentary in nature.

Figure 8:
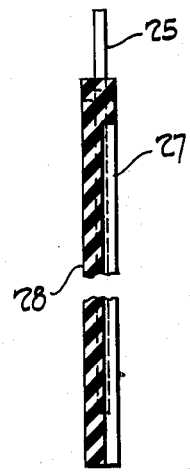

FIGURE 8 is a sectional view taken about on the line 8—8 of FIGURE 7 looking in the direction of the arrows.

Referring to FIGURE 1, a tractor unit 1 is shown as being connected to and drawing a trailer unit 2, the tractor being supported on wheels such as 3 and 4, the trailer in turn being supported on similar wheels, usually dual in nature and denoted 5.

Adjacent the wheels 5 of the trailer 2, the splash guard generally denoted 6 is shown and will now be described in conjunction with FIGURE 2, being an enlarged view and somewhat more in detail.

The trailer 2 includes a chassis 7 at the rear of which the flap 6 is shown as being suspended, the bolts 8 with nuts 9 thereon providing for such suspension and being adapted to be entered in suitable mounting openings denoted 10 in the flap or splash guard unit 6. A splash guard is suspended in rear of each of the rear wheels.

Figure 5:
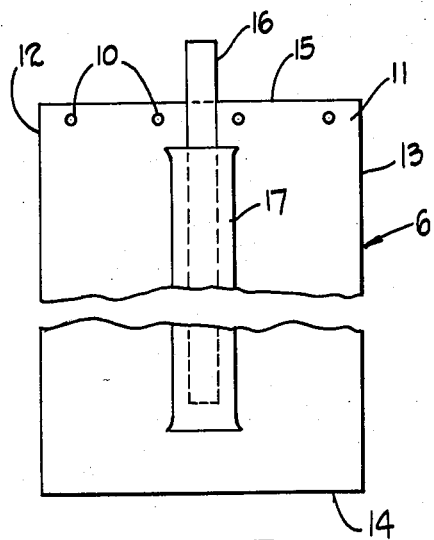
FIGURE 5 is a face view, fragmentary in nature showing rigidifying means and reinforcing means in position.

Assuming that the splash guard unit 6 is shown in enlarged detail in FIGURE 3, the same will now be described in conjunction with said FIGURE and is shown in edge view as comprising a flexible body 11 generally rectangular in shape as indicated in FIGURE 5 for example, this being a view generally taken from the left-hand face of FIGURE 3, the body 11 having the mounting openings 10 along the upper edge thereof and the side edges being denoted at 12 and 13 with the bottom edge 14 and the extreme upper edge 15.

As will be apparent this is a generally rectangular unit and formed of molded material which is of any preferred composition for the purposes and well known, not forming in and of itself a part of this invention.

Shown as molded into the body 11, is a rigidifying member in the form of a bar or stiffening member 16 which extends about centrally of the side edges 12 and 13 and is molded into the body so as to extend outwardly beyond the upper edge 15 thereof.

As will be apparent a reinforcing section 17 in the form of a strip such as indicated about as to position in FIGURE 5 and being essentially additional material molded at the same time the unit itself is molded and in effect providing a rib extending outwardly beyond the face of the splash guard body 11.

Referring now to FIGURE 2 again, it will be seen that the rigidifying or stiffening member 16 extends upwardly beyond the mounting bolts and nuts 8 and 9, so that it is arranged to impinge or coact with the rear face of the chassis section indicated at 20. It will be thus clear that when the splash which would be directed rearwardly from the rear wheels of the trailer 2 against the face in the direction about as indicated by the arrow A, the tendency would normally be to cause the flap to swing in a counter-clockwise direction. This swinging action is minimized and reduced by reason of the rigidifying member 16 extending beyond the upper edge and the mounting bolts 8 so as to impinge against the chassis member 20 and thus limit the rearward swinging action of the splash guard 6. Since the rigidifying member 16 extends substantially throughout the vertical height of the flap, the stiffening of the flap is imparted thereto by such arrangement. At the same time it will be understood that when the vehicle backs up against an obstruction which would strike the opposite face of the flap or splash guard, the same will be permitted to move in a clockwise direction because the member 16 will not coact with anything that would prevent such movement and the upper edge of the splash guard or mounting edge is flexible enough to permit such movement.

Figure 6:
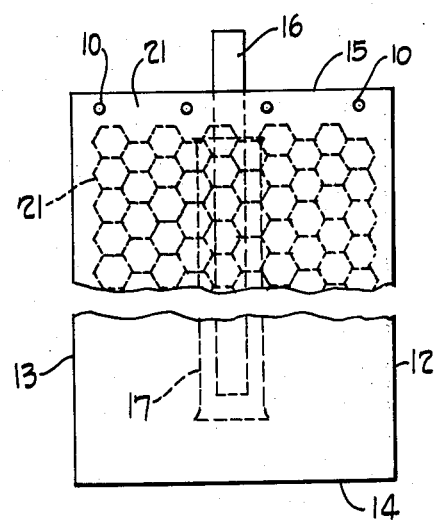
FIGURE 6 is a view similar to FIGURE 5 taken from the opposite side thereof showing additional reinforcing means in position with the rigidifying means extending therefrom.

With the foregoing in mind it will be understood that the action tending to move the flap or splash guard in the direction indicated by the arrow at A will during the course of movement of the vehicle be substantial as to force and thus the reinforcing element 17 is desirable. In addition it may be further desirable to reinforce the splash guard by the provision of mesh such as is indicated in FIGURE 4 at 21 likewise in FIGURE 6 and consisting of chicken wire or the like integrally molded into the body of the flap ahead of the rigidifying member 16 so as to speak and in rear of the reinforcing section 17 of said splash guard.

In the actual manufacture of a splash guard according to this invention, the same would be comprised of the elements as shown in the exploded view of FIGURE 4 including the reinforcing part 17, a layer of material from which the flap body is desirably formed indicated at 22, the reinforcing mesh at 21, the rigidifying bar or member 16 and a further layer of material 23, all of the same combined in a mold and integrally united by the molding process which is well known.

A splash guard then about as seen in FIGURE 3 in edge view would be furnished with some material actually between the rigidifying bar or member 16 and the face upon which the reinforcing portion 17 is positioned.

Referring now to FIGURE 7 in modified form in this instance a pair of rigidifying members denoted 24 and 25 may be supplied, the splash guard being constructed in this instance with border sections 26 and 27 of thicker material than the body of this particular splash guard in this case denoted 28 with the upper edge or mounting section denoted 29 and having the mounting holes 30 therein.

It will be understood that by reason of the rigidifying members 24 and 25, this particular flap or splash guard will be less likely to sail or move rearwardly than the splash guard even of FIGURE 5 but at the same time the expense of constructing the same is of course greater or may be under some circumstances. It is also to be understood that reinforcing mesh such as 21 shown in FIGURE 4 could be supplied and molded into the splash guard body shown in this instance in edge view and section at FIGURE 8.

It will thus be apparent that since the rigidifying members extend outwardly beyond the mounting edge of the splash guard or flap, and can cooperate with a portion of the chassis or frame of the vehicle to prevent the rearward movement of the lower edge of the splash guard, additional advantage and improved action of the splash guard will be obtained to prevent the rearward splashing of material in large measure to a better degree than that of the first described form of guard or possible with previous flaps or splash guards.

We claim:

1. In splash guard construction of the class described, in combination a flexible body adapted to be suspended from a vehicle in rear of the wheels thereof, means for mounting said body on said vehicle and including means located near one edge of said body for supporting said body on said vehicle, rigid means comprising a strip of nonflexible material molded into said body to minimize flexing thereof, said strip extending outwardly from said one edge of said body to cooperate with said vehicle to prevent rearward swinging action of said body.

2. In splash guard construction as is defined in claim 1 and wherein reinforcing means comprising a mesh member is molded into said flexible body.

3. In splash guard construction of the class described, in combination, a generally rectangular flexible body adapted to hang substantially vertically from a vehicle in rear of the wheels thereof, means to mount the body in such position, and non-flexible means to rigidify said body comprising a strip of rigid material integrally molded in said body, extending generally vertically therein and projecting outwardly beyond an edge thereof to prevent rearward swinging of said body.

4. The combination as defined in claim 3 and wherein the means to mount the body are arranged near one edge, and the strip of rigid material is molded in approximately the center of the flexible body.

5. The combination as defined in claim 3 and wherein the mounting means are located near the upper edge of the body, said body being suspended therefrom, and the rigidifying means comprises a strip of rigid material molded into the body about midway between the side edges thereof.

6. The combination as defined in claim 3 and wherein the mounting means are located near the upper edge of the body, said body being suspended therefrom, and the rigidifying means comprises a strip of rigid material molded into the body about midway between the side edges thereof, said strip of material extending from near the lower edge of the body, upwardly and beyond the upper edge thereof.

References Cited in the file of this patent

UNITED STATES PATENTS

| | | |
|---|---|---|
| 2,619,363 | Wenham et al. | Nov. 25, 1952 |
| 2,683,612 | Bacino | July 13, 1954 |
| 2,699,955 | Eaves | Jan. 18, 1955 |
| 3,027,178 | Eaves | Mar. 27, 1962 |
| 3,051,508 | Federspiel | Aug. 28, 1962 |
| 3,059,945 | Robb | Oct. 23, 1962 |